March 30, 1926.
F. H. HEADLEY
PERAMBULATOR, BABY CARRIAGE, AND LIKE VEHICLE
Filed August 18, 1922    2 Sheets-Sheet 1
1,578,516
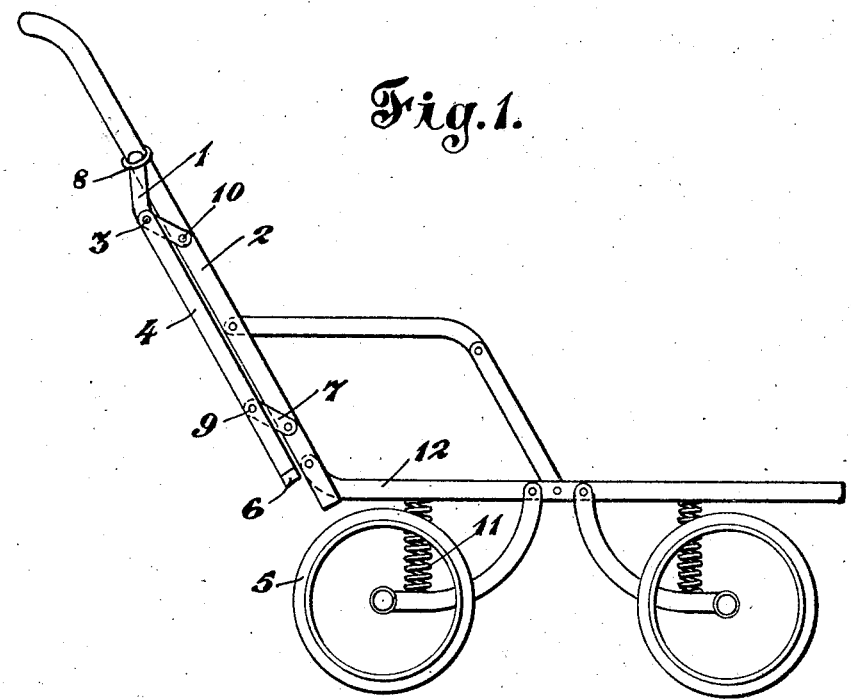
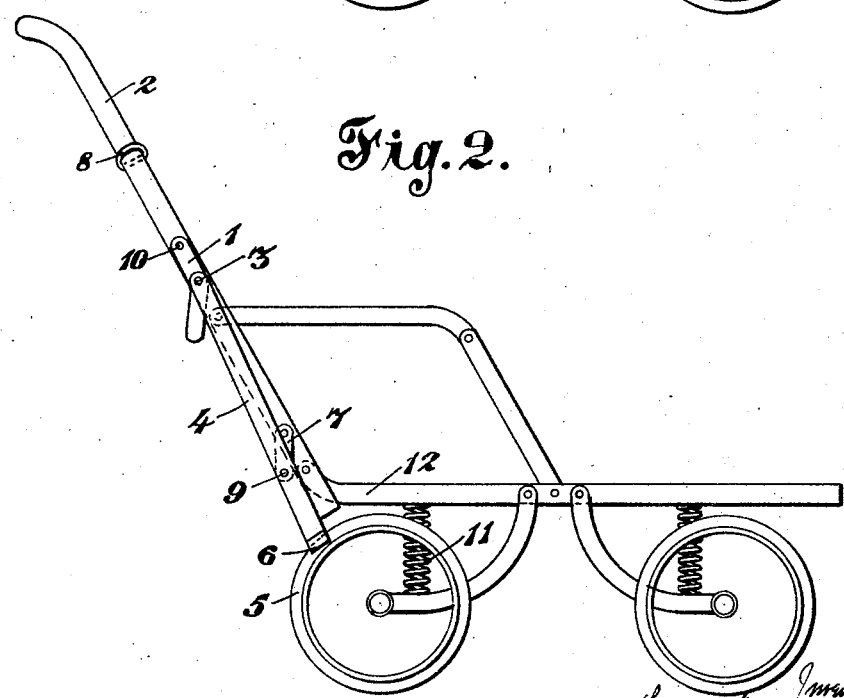

March 30, 1926. 1,578,516
F. H. HEADLEY
PERAMBULATOR, BABY CARRIAGE, AND LIKE VEHICLE
Filed August 18, 1922 2 Sheets-Sheet 2
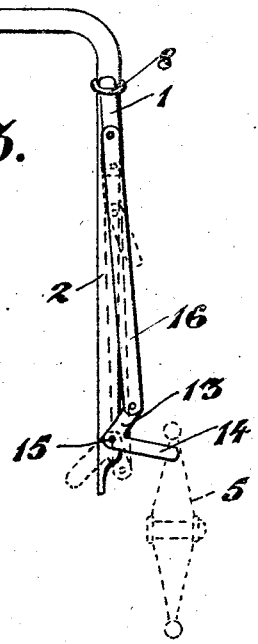
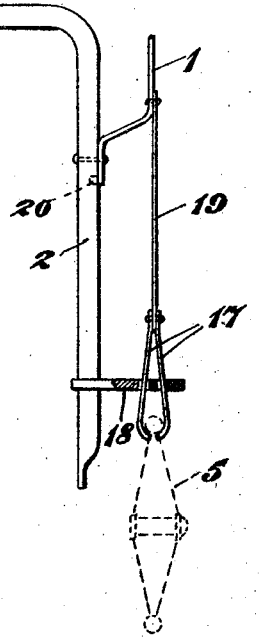
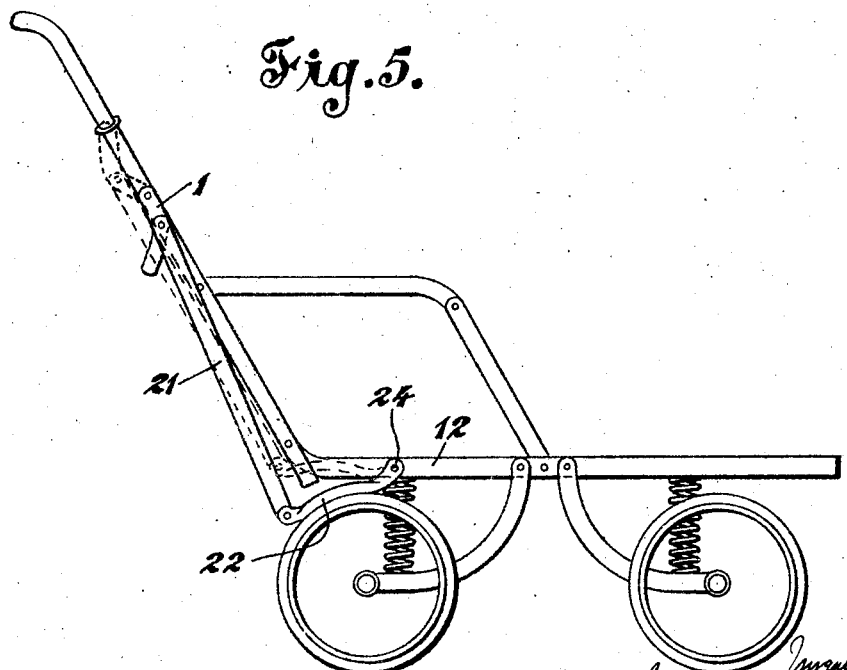

Patented Mar. 30, 1926.

1,578,516

UNITED STATES PATENT OFFICE.

FREDERICK HAGGER HEADLEY, OF BIRMINGHAM, ENGLAND, ASSIGNOR TO TAN SAD LIMITED, OF BIRMINGHAM, ENGLAND, A CORPORATION OF GREAT BRITAIN.

PERAMBULATOR, BABY CARRIAGE, AND LIKE VEHICLE.

Application filed August 18, 1922. Serial No. 582,727.

*To all whom it may concern:*

Be it known that I, FREDERICK HAGGER HEADLEY, a subject of the Kingdom of Great Britain, residing at Birmingham, England, have invented Improvements Relating to Perambulators, Baby Carriages, and like Vehicles, of which the following is a specification.

The present invention has relation to perambulators, baby carriages, and like vehicles, either of the folding or rigid (permanently extended) type and has for its object to provide improved wheel engaging means for preventing the vehicle from inadvertently running or travelling when left unattended.

According to the present invention I provide means adapted to engage a wheel of the vehicle and be operated from the handle frame or other suitable part of the vehicle conveniently at an elevated position whereby it is easy of manipulation and where it will be easily kept clean.

The wheel engaging means is operated through the medium of a small hand lever pivoted to the handle proper of the vehicle, and adapted to be brought over a dead centre position to retain said means in engagement with the wheel.

In order that this invention may be clearly understood and readily carried into practice, reference may be had to the appended explanatory sheet of drawings, upon which:—

Figures 1 and 2 illustrate in elevation a perambulator having wheel engaging means according to one form of the present invention.

Figures 3, 4 and 5 illustrate modified forms of wheel engaging means or apparatus.

In one embodiment of the present invention (Figures 1 and 2) a small hand lever 1 is pivotally connected to one of the upright limbs of the handle proper 2 of the vehicle, and this hand lever has hinged thereto at a suitable position 3 along its length a brake link 4 adapted at its lower extremity to bear upon the tire of the wheel 5 or otherwise suitably engage the wheel. Conveniently the lower extremity of this brake link is curved to a channel formation at 6 to engage the said tires. This brake link is further connected to the lower part of the handle upright 2 aforesaid by a small connecting link 7, and a helical spring may be incorporated between the said brake link and the handle upright tending to disengage the link portion 6 from the wheel, although this spring is in no way essential and is not illustrated. The hand lever 1 may be held in the out of use position as shewn in Figure 1 by a pivotal ring 8.

In operation the hand lever 1 which is disposed adjacent the upper extremities of the handle upright 2 is moved through a suitable angle preferably substantially 180 degrees or slightly less until its pivot point 3 with the brake link 4 is moved beyond a center line passing through the pivot point 10 of the handle 1 and the pivot point 9 on the brake link and in this manner the said hand lever 1 is drawn over its dead center and the link portion 6 is automatically retained in engagement with the wheel. This engagement is further assisted by the spring mounting 11 of the wheels 5 in relation to the frame 12 of the vehicle inasmuch as the application of the wheel engaging means tends to strain the said spring mountings 11.

The foregoing mechanism although suitable for a rigid perambulator is particularly adapted for use in connection with a collapsible perambulator such as that illustrated in the Figures 1 and 2, in which the handle proper 2 is adapted to fold into adjacency with the frame 12. The mechanism in the present instance, moves in unison with the handle and lies adjacent thereto when the handle is collapsed.

In another embodiment of the present invention (Figure 3) a small hand lever 1 adapted to be pivoted to the handle proper 2 as before is adapted to operate a small bell-crank lever 13, 14 pivoted at 15 to the lower part of the handle proper 2 through the medium of a connecting link. One link 13 of the bell crank lever is connected to the handle 1 by the link 16 and the other link 14 is adapted to be brought between and away from the spokes of the wheels 5 by the operation of the hand lever 1 which is passed over the dead centre position as hereinbefore. A helical or other spring may be employed to hold the brake in the operative position with handle 1 over dead centre that is said spring normally tends to take brake off or a ring 8 may be employed for securing the said handle.

In another embodiment of the present invention (Figure 4) a hand lever 1 pivoted to the handle proper 2 of the vehicle is adapted to operate a bifurcated or forked structure 17 which has a sliding connection with a fixed element 18 attached to the lower part of the handle bar proper 2. The outer extremity of the limbs of this forked or bifurcated element 17 are curved inwardly and adapted to cooperate with the spokes of the wheels 5 or embrace the tire and the opposite extremities of the limbs are pivoted or otherwise secured to a connecting link 19 which is connected to the hand lever 1. By operating the hand lever 1 the limbs 17 of the fork can be closed and opened to engage and disengage the wheel 5. The lever 1 may have a projecting part 20 adapted to bear against the handle 2 when lever 1 is moved over a dead centre position. A helical or other spring may be employed tending to hold lever 1 over its dead centre position i. e. tending normally to take brake off. In another embodiment of the present invention (Figure 5) the hand lever 1 and a connecting element 21 pivoted thereto may be adapted to operate a brake arm 22 which has a pivotal connection with the handle upright or as shewn with the frame 12 at 24 of the baby carriage. Such an arrangement is retained in engagement with the wheel in any of the manners of dead centre movement aforesaid in cooperation with a suitable spring tending to withdraw the brake.

In a further modification of the present invention the operating mechanism may be contained within one of the hollow tubes 1 of the handle proper 2 of the vehicle. The hand lever 1 may however, in any instance, be attached to any suitable part of the vehicle such as the frame or an extension thereof in lieu of the handle, or the body of the vehicle may in some instances carry the hand lever. The hand lever may be adapted to move in a plane corresponding to the length of the vehicle or in a plane at right angles thereto. Obviously the construction of the braking mechanism may be varied considerably without departing from the spirit of the invention.

What I claim as my invention, and desire to secure by Letters Patent is:—

1. A perambulator, baby carriage or like vehicle having a handle member, a link arranged adjacent the handle member, a wheel engaging member operatively connected to the bottom end of the link, a lever pivoted to the handle member and to the top end of said link and adapted to be brought over a dead center position to retain said wheel engaging member in engagement with the wheel, and means mounted on the handle and adapted to engage the bottom end of the link to guide the wheel engaging member into engagement with the wheel.

2. A perambulator, baby carriage or like vehicle having a frame, wheels arranged in pairs and operatively connected to the frame, a handle member operatively connected to the frame and extending radially with respect to the axis of one pair of wheels, a member extending substantially parallel with the handle, a wheel engaging device at the bottom end thereof, and links connecting said members to the handle member so that one end of one of said links may be brought over a dead center position to retain said wheel engaging device, in engagement with the wheel, one of said links including an extension forming a lever to actuate said member extending substantially parallel with said handle.

3. A perambulator, baby carriage, or like vehicle, having wheel engaging means comprising a hand lever pivoted to the handle proper of the vehicle a link adapted to engage the wheel at its one extremity and pivoted to the hand lever at its other extremity, and an intermediate pivotal link connecting such link to the handle proper.

4. A perambulator, baby carriage or like vehicle having a frame, wheels arranged in pairs and one of said pairs being resiliently mounted with respect to the frame, a handle member operatively connected to the frame and extending radially with respect to said resiliently mounted pair of wheels, a member extending substantially parallel with the handle, a wheel engaging element at the bottom end thereof, a lever pivoted to the top end of said member and to said handle member and adapted to be brought over a dead center position with respect to a line through the point of engagement with the wheel and the point of pivot of the lever with said handle member so that the resilient mounted pair of wheels act to hold said member in this position, and means operatively connecting the other end of said member with said handle member.

In witness whereof I have hereunto set my hand.

FREDERICK HAGGER HEADLEY.